UNITED STATES PATENT OFFICE.

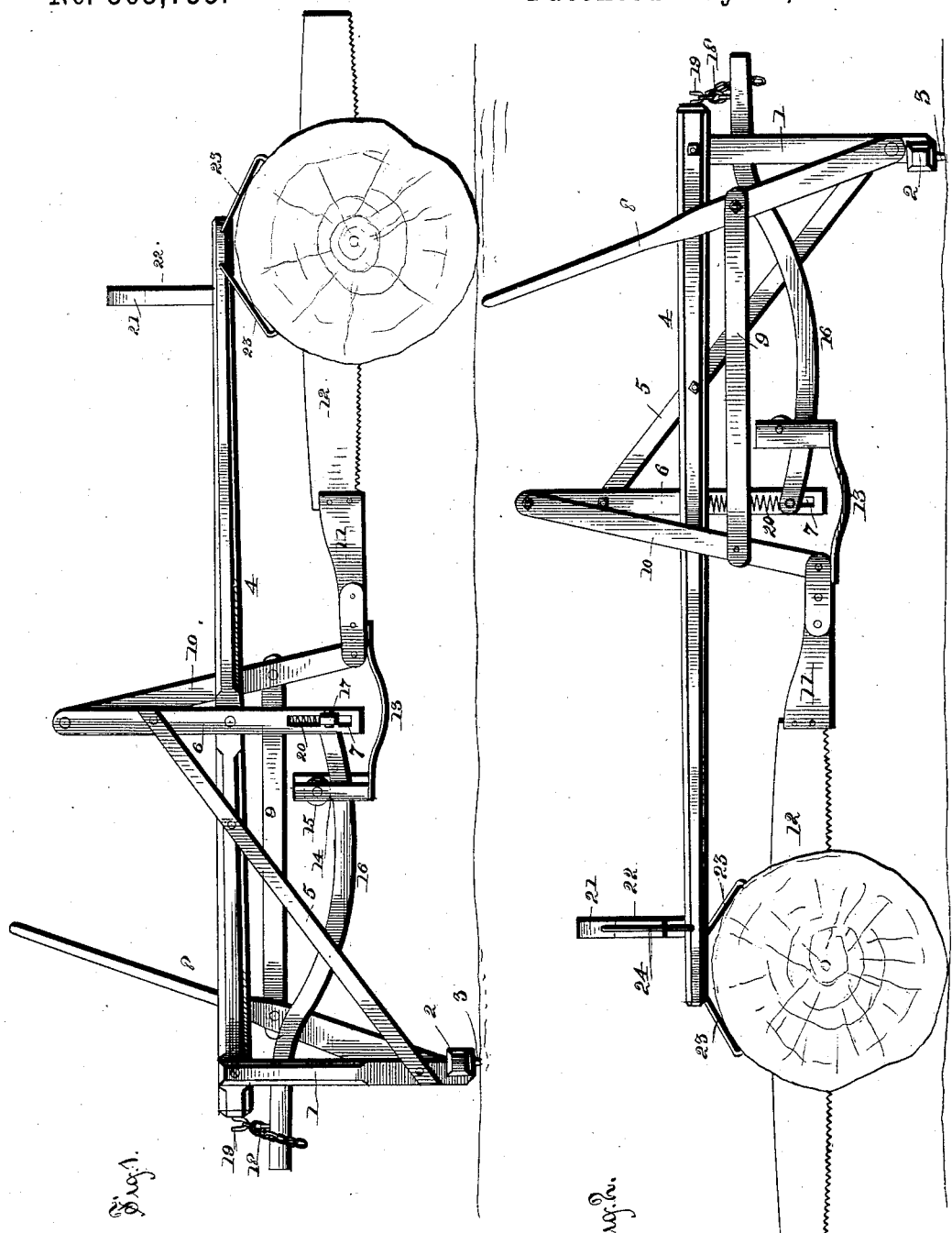

JOHN DOHM, OF AMBOY, MICHIGAN.

DRAG-SAW.

SPECIFICATION forming part of Letters Patent No. 363,733, dated May 24, 1887.

Application filed February 14, 1887. Serial No. 227,503. (No model.)

*To all whom it may concern:*

Be it known that I, JOHN DOHM, of Amboy township, in the county of Hillsdale and State of Michigan, have invented certain new and useful Improvements in Drag-Saws; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved drag-saw, showing it in operation; and Fig. 2 is a similar view seen from the other side.

Similar numerals of reference indicate corresponding parts in both the figures.

My invention has relation to that class of drag-saws or crosscut log-saws in which the saw is reciprocated by means of a lever; and it consists in the improved construction and combination of parts of the same, as hereinafter more fully described and claimed.

In the accompanying drawings, the numeral 1 indicates an upright secured at its lower end to a transverse foot-piece, 2, having studs or points 3 upon its under side for the purpose of giving it a firm support upon the ground, and a longitudinal frame-bar, 4, is secured with its inner end to the upper end of the upright at a right angle to the same, and is braced by means of an inclined brace-bar, 5, secured to the lower end of the upright and to the longitudinal bar, and having its upper end projecting above the longitudinal bar and secured to an upright, 6, secured to the longitudinal bar at a right angle to the same, and having a vertical slot, 7, at its lower end.

The operating-lever 8 is fulcrumed to the side of the lower end of the upright at the foot-piece, and has a pitman, 9, pivoted to it above the fulcrum, the outer end of which pitman is pivoted to a supporting-lever, 10, fulcrumed at its upper end to the upper end of the slotted upright.

The handle 11 of the saw 12 is pivoted to the lower end of the supporting-lever, and the forward or outer end of a flat and strong spring, 13, is secured to the under side of the handle and is secured to the lower end of a frame or slotted block, 14, at its inner end, the said frame having a roller or sheave, 15, journaled in it.

The roller-frame fits around and travels with the roller upon an arched bar, 16, having a flat bolt, 17, at its forward end, which slides in the longitudinal slot of the outer upright, and having a straight handle at its inner end, to which a chain, 18, is secured, which chain may be secured with one of its links to a hook, 19, at the rear or inner end of the longitudinal frame-bar.

A coiled spring, 20, is secured with its lower end to the forward or outer end of the arched bar and with its upper end to the longitudinal frame-bar, and serves to support the outer end of the arched bar, while giving the said end of the bar sufficient freedom to play with its flat bolt in the slot.

The outer end of the longitudinal frame-bar is provided with an upright guide-block, 21, having a vertical slot, 22, open at its lower end, into which slot the saw may be inserted, and in which it may reciprocate, a hook, 24, serving to support the saw when not in use. Hooks 23 are pivoted to the side of the outer end of the longitudinal frame-bar, serving to engage and hold the log to be sawed.

When the saw is to be operated, the outer end of the frame-bar is placed upon the upper side of the log and the hooks are driven with their points into the log, securing the outer end of the saw-frame to the log, while the studs of the foot-piece secure the inner end of the frame, and the saw-blade will be within the guide-slot, so that when the operating-lever is rocked and the saw-blade reciprocated the saw may be guided while starting the cut, preventing the possibility of the cut being started wrong or a number of cuts or hacks being made in the log, as well as also preventing any possibility of the saw breaking or being injured by the teeth slipping over the outer side of the log and accidentally becoming stuck in some obstruction upon the log.

The saw will receive a vertically-rocking motion as well as a reciprocating motion by the guide-frame traveling upon the arched guide-bar; and the outer end of the saw may be lowered by raising the inner end of the guide-bar by means of the chain when the saw has arrived at the lower portion of its cut.

The flat spring connecting the handle of the saw-blade to the guide-block will admit of a certain play for the saw, and the coiled spring supporting the outer end of the arched guide-bar will serve to draw the said bar upward against the weight of the guide-frame, and the strain of the saw in the log allowing the flat bolt of the guide-bar to play freely in the vertical slot.

The entire saw and frame is simple, and may be made very durable and at a comparatively low cost, and any portion of the frame which might be broken or injured may be repaired or replaced without the necessity of the employment of skilled labor.

Having thus described my invention, I claim and desire to secure by Letters Patent of the United States—

1. In a crosscut log-saw, the combination of a saw having its handle pivoted to a swinging lever having means for reciprocating the same, an arched guide-bar, and a flat spring secured to the saw-handle and secured at its inner end to a guide-frame traveling with a roller upon the arched guide-bar, as and for the purpose shown and set forth.

2. In a crosscut log-saw, the combination of a frame consisting of an upright having a foot-piece, and a longitudinal frame-bar having a slotted saw-guide at its outer end and having hooks at the said end, and a vertical bar having a vertical slot in its lower end and supported by means of an inclined brace, and secured to the frame-bar, an operating-lever fulcrumed at its lower end to the lower end of the upright, a supporting-lever fulcrumed with its upper end to the upper end of the vertical bar or upright having the slot, a connecting-rod pivoted to the two levers, a saw having its handle pivoted to the lower end of the supporting-lever, an arched guide-bar having a flat bolt at its outer end sliding in the slot of the outer upright, and having a chain at its inner end engaging a hook upon the rear end of the longitudinal frame-bar, and provided with a spring secured to its forward or outer end and to the longitudinal bar, and a guide-frame having a roller traveling upon the arched guide-bar, and having a flat strong spring secured with the inner end to it and with the outer end to the saw-handle, as and for the purpose shown and set forth.

In testimony that I claim the foregoing as my own I have hereunto affixed my signature in presence of two witnesses.

JOHN DOHM.

Witnesses:
NANCY J. MUNK,
RACHEL E. MUNK.